Figure 1:
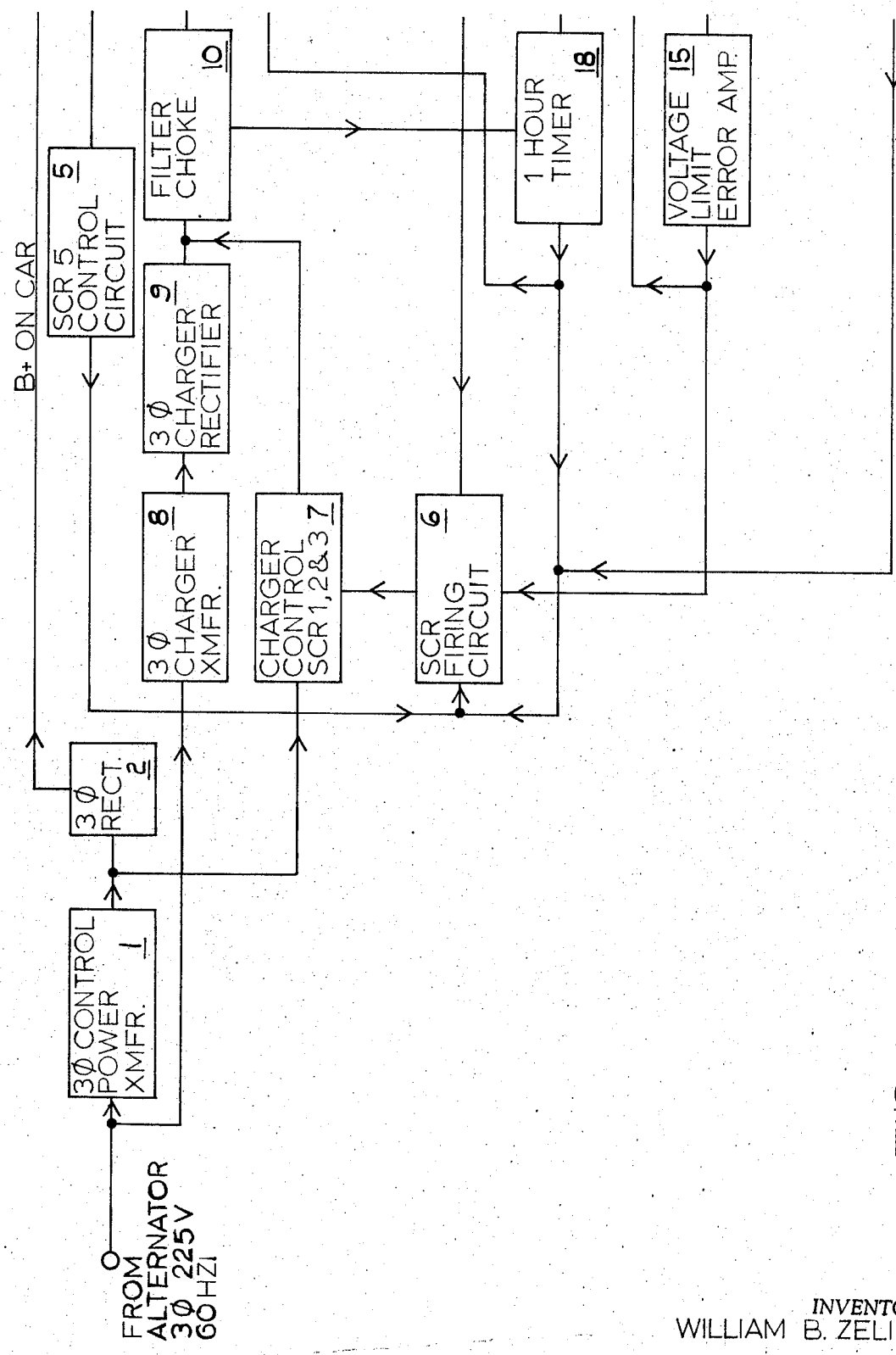

United States Patent [19]
Zelina

[11] 3,784,892
[45] Jan. 8, 1974

[54] BATTERY CHARGING SYSTEM FOR EMERGENCY BATTERY SYSTEMS

[75] Inventor: William B. Zelina, Edinboro, Pa.
[73] Assignee: General Systems, Inc., Erie, Pa.
[22] Filed: May 20, 1971
[21] Appl. No.: 145,388

[52] U.S. Cl.................. 320/40, 320/59, 307/46, 307/66
[51] Int. Cl............................ H02j 7/06, H02j 7/34
[58] Field of Search .................. 320/39, 40, 56, 59; 307/66, 46; 317/40 A, 151

[56] References Cited
UNITED STATES PATENTS

| | | | |
|---|---|---|---|
| 2,821,677 | 1/1958 | Knight | 307/46 X |
| 3,211,964 | 10/1965 | Thorne | 317/151 |
| 3,474,296 | 10/1969 | Rickey | 320/40 X |
| 3,603,973 | 9/1971 | Hough | 307/66 |
| 3,480,791 | 11/1969 | Lesher | 307/66 |
| 3,454,781 | 7/1969 | Scholler | 307/66 |
| 3,573,541 | 4/1971 | Dunn et al. | 307/66 X |
| 3,585,482 | 6/1971 | Zelina | 320/39 |
| 3,614,535 | 10/1971 | Apel | 320/40 X |

Primary Examiner—James D. Trammell
Assistant Examiner—Robert J. Hickey
Attorney—Charles L. Lovercheck

[57] ABSTRACT

A completely static battery charging system which recognizes the battery charged state and also the battery operating temperature where a solid state valve is used to isolate the battery from the load; said valve rendered conductive instantly when the load voltage drops below a predetermined value. Means is included for decreasing the charge rate to the float voltage that will maintain full charge on the battery at all temperatures after it has been fully charged. Protective means is included to prevent either battery or system damage should an abnormal battery condition develop, said protective means including individual shorted cells, improper solution level, abnormal battery impedance, and poor electrical connections either in the individual cells or the interconnecting electrical connections.

19 Claims, 7 Drawing Figures

BATTERY CHARGING SYSTEM FOR EMERGENCY BATTERY SYSTEMS

This invention relates generally to the proper control of storage battery charging. More particularly, the invention relates to fully charging storage batteries in the shortest possible time with minimum water consumption. To this extent, this invention relates to my invention described in U.S. Pat. No. 3,585,482, issued to William B. Zelina.

This invention extends this prior work to systems where the load is of such a nature that it cannot accept the voltage levels that are required to fully charge batteries at low temperatures on the one hand and the low voltages required to limit the charge current to the normal charge rate at high operating temperatures, i.e., the voltage excursion when considering all battery operating temperatures and all battery state of charge conditions is too great for proper operation of the system on which the battery is to provide the emergency stand-by power.

Further, this invention teaches the effective protection against contingent damages to costly systems that might occur if certain abnormal battery systems develop. In particular, the new generation of rapid transit cars have experienced very costly damage due to fires that have occurred in the battery compartment due to a combination of abnormal battery conditions and improper charging voltages for these conditions and temperatures. This invention, therefore, teaches effective protective means to preclude said contingent damage under the many possible charging system's fault conditions.

Further, this invention teaches the prevention of excessive battery discharges that can occur if system loads are not reduced to the essential minimum under emergency conditions.

The prior art utilized in these charging systems consisted of floating the battery on the power system at a potential that would result in acceptable water consumption. In some cases this prior art also utilized temperature sensing means to change this potential in response to battery temperature. These systems have operated on the transit and other railroad stock vehicles for many years, however, with these systems the emergency power demand on the batteries were such that a partially charged battery was sufficient to satisfy these demands. Further, the time available for restoring even a partial state of charge to these batteries was adequate.

With the new generation cars, the power demand on the battery increased in some cases in order of magnitude. Further, space and weight and economic requirements dictated a minimum rating on the battery. These requirements in turn dictated that the battery be quickly and efficiently restored to a full charged state. When this was attempted with the prior art system by raising the float voltage, water consumption became excessive and impractical from a maintenance point of view resulting in battery damage and, in many cases, vehicle fires that have completely destroyed in some cases the transit vehicle and in other cases caused extensive damage to the battery system and parts of the transit vehicle.

In the execution of the charging function of this invention, it was necessary to provide isolation of the battery from the system load during battery charging. The battery charging consists of the temperature compensated - peak point - float system described in my U.S. Pat. No. 3,585,482. The isolating means consists of an electrical valve preferably of solid state construction which can block electrical current flow in either direction and can be triggered into a conductive state when the system voltage drops below a predetermined value, said isolating means to include sensing means to determine the conductive state of said isolating means and logic means to render the charger inoperative when said isolating means are conductive.

The foregoing function precludes subjecting the system loads to the wide excursion in voltage required to satisfy all conditions of battery charged state and battery solution temperature.

GENERAL DESCRIPTION OF DRAWINGS

Figure 2:
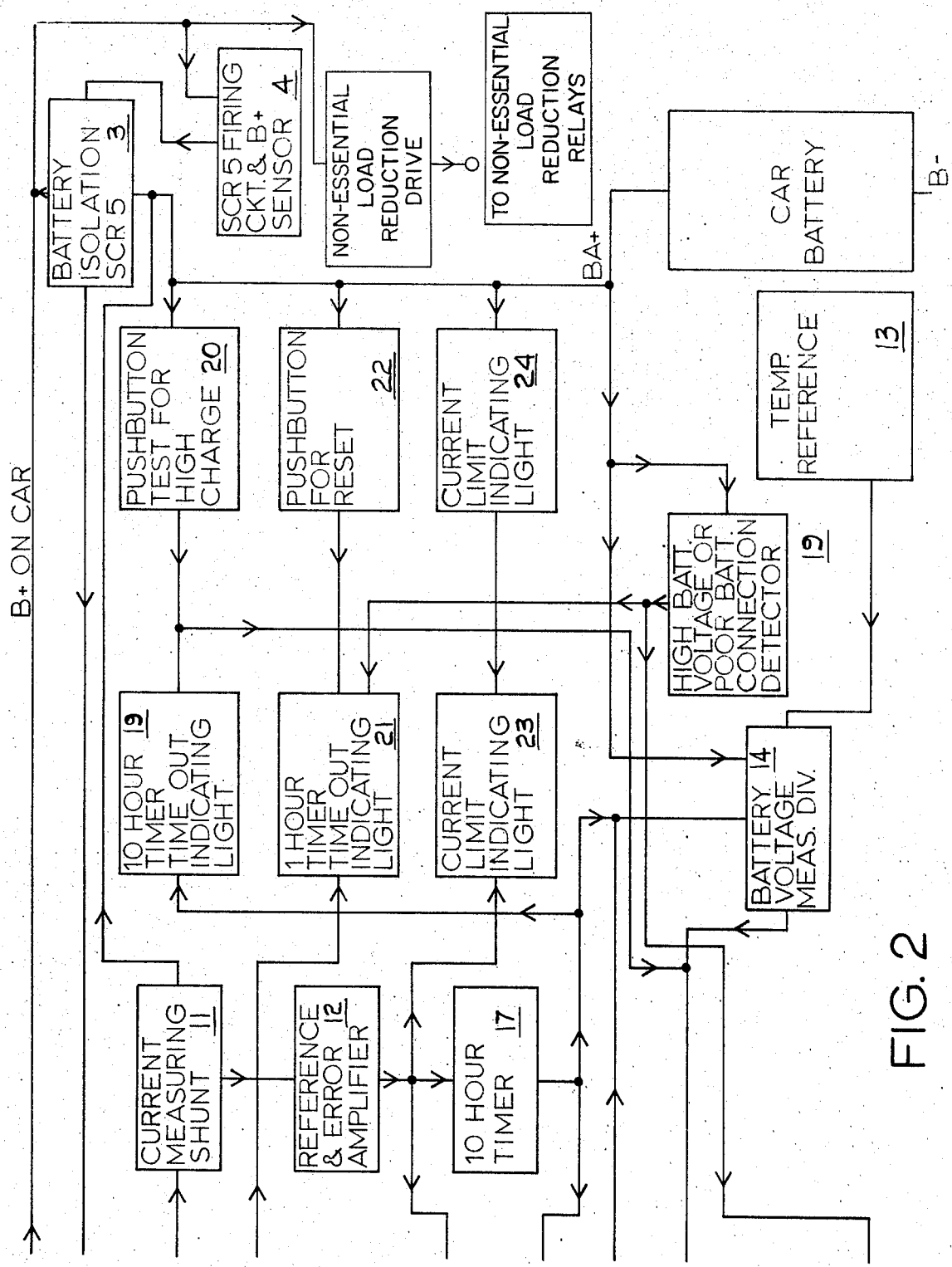

FIGS. 1 and 2 together make up a single line block diagram that describes the system according to the invention.

Figure 3:
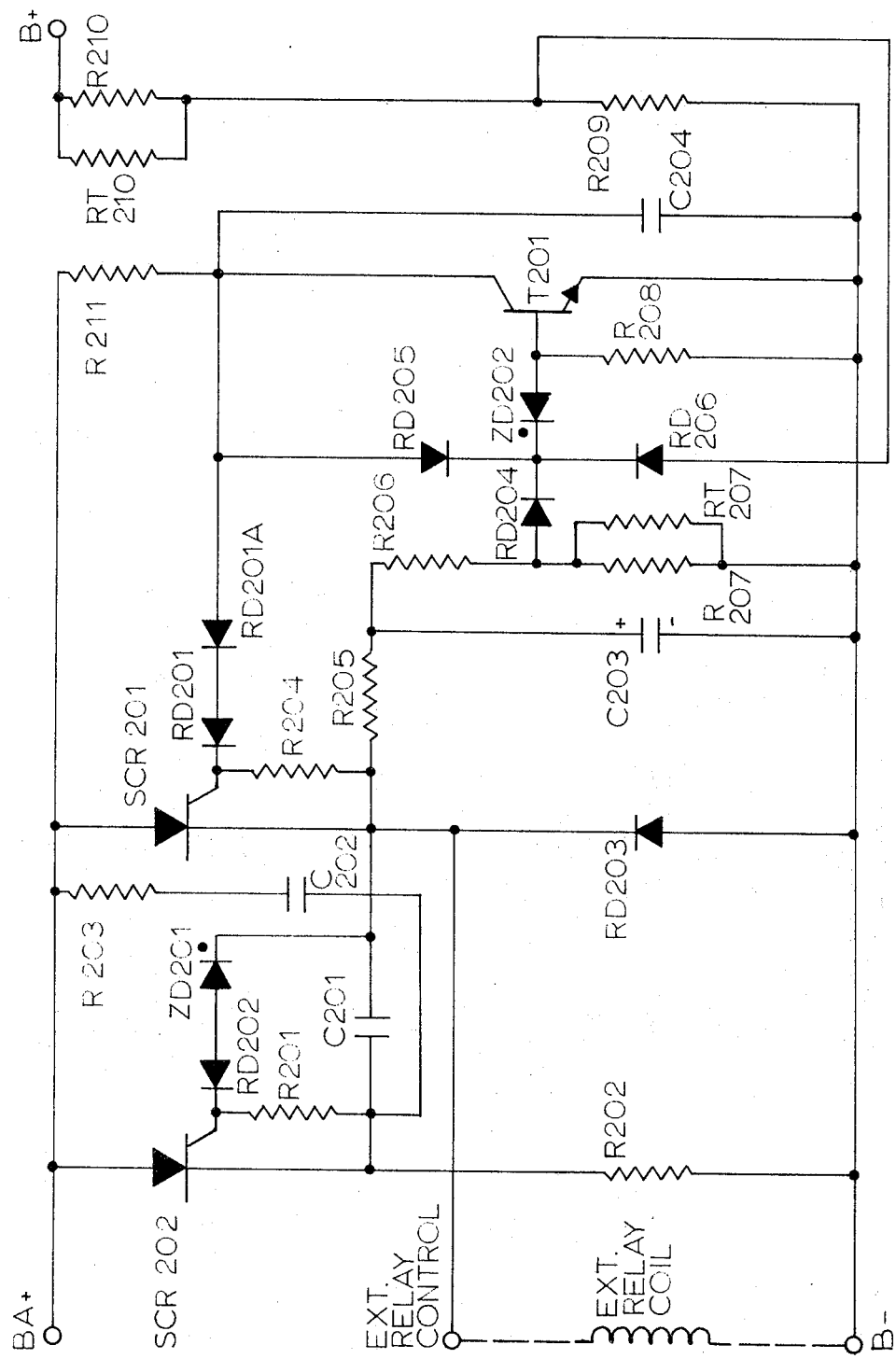

FIG. 3 is a schematic diagram that describes the circuit detail of the non-essential load reduction relay drive system.

Figure 4:
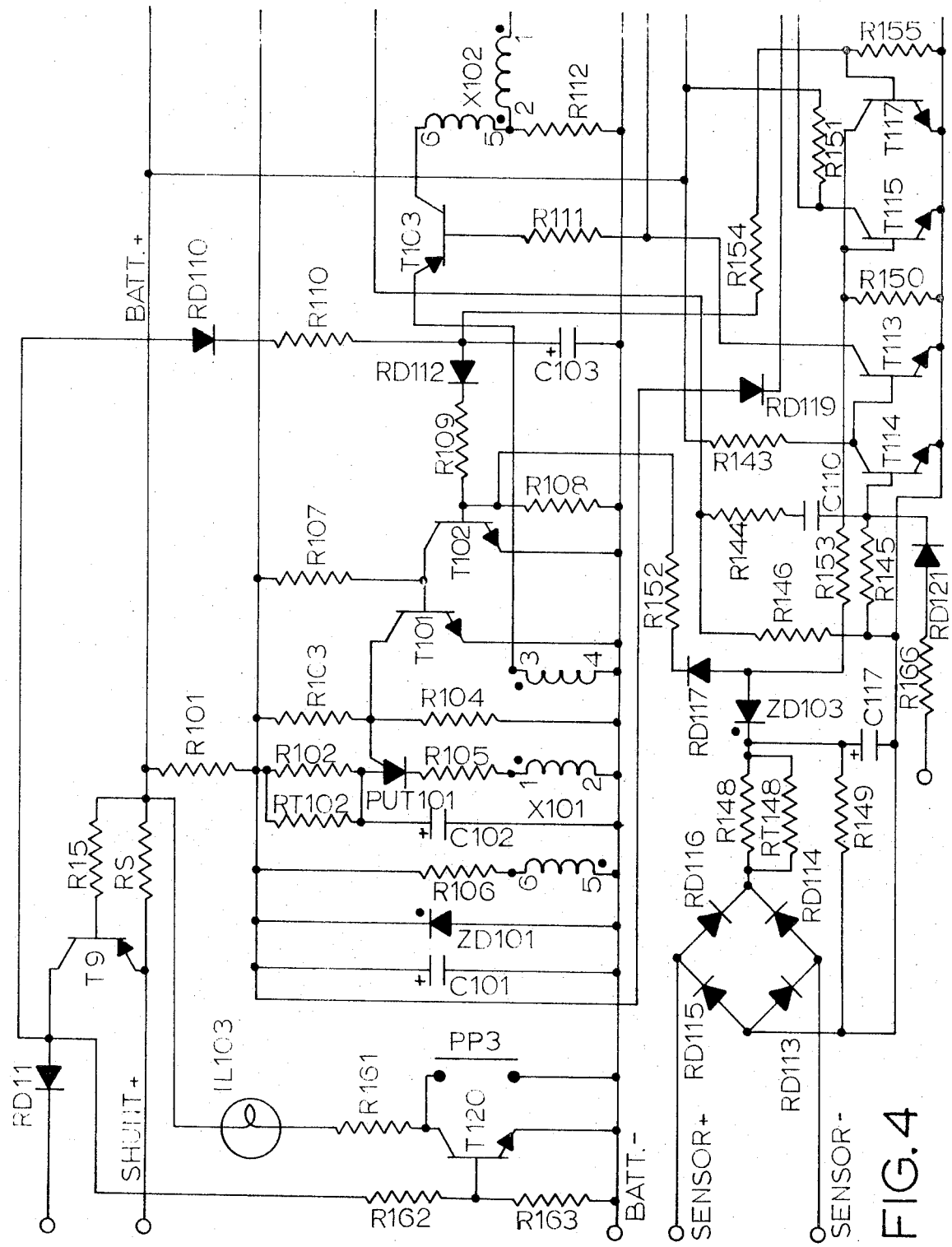
Figure 5:
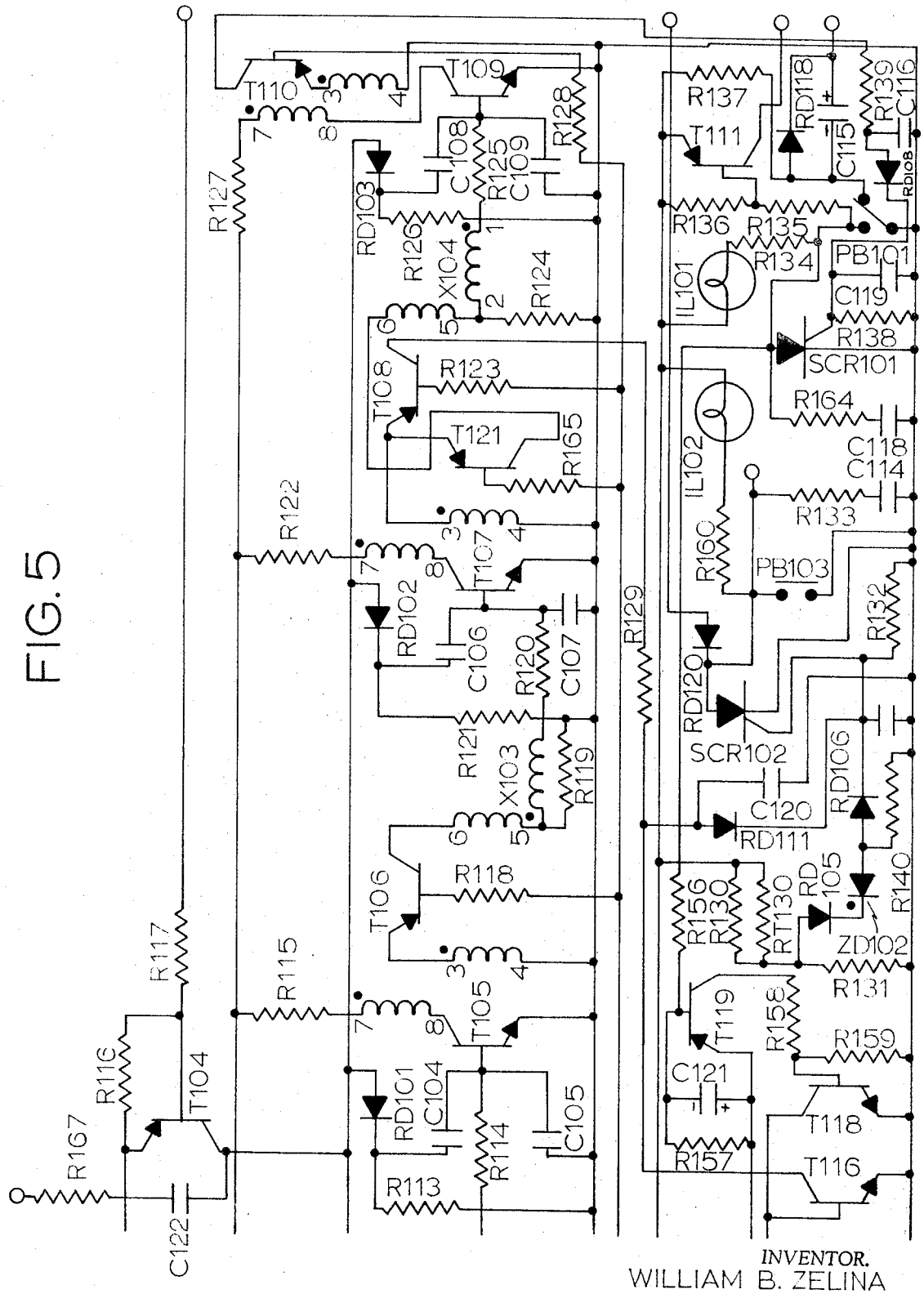

FIGS. 4 and 5 together are the schematic diagram representation of the protective circuitry embodied in the invention.

Figure 6:
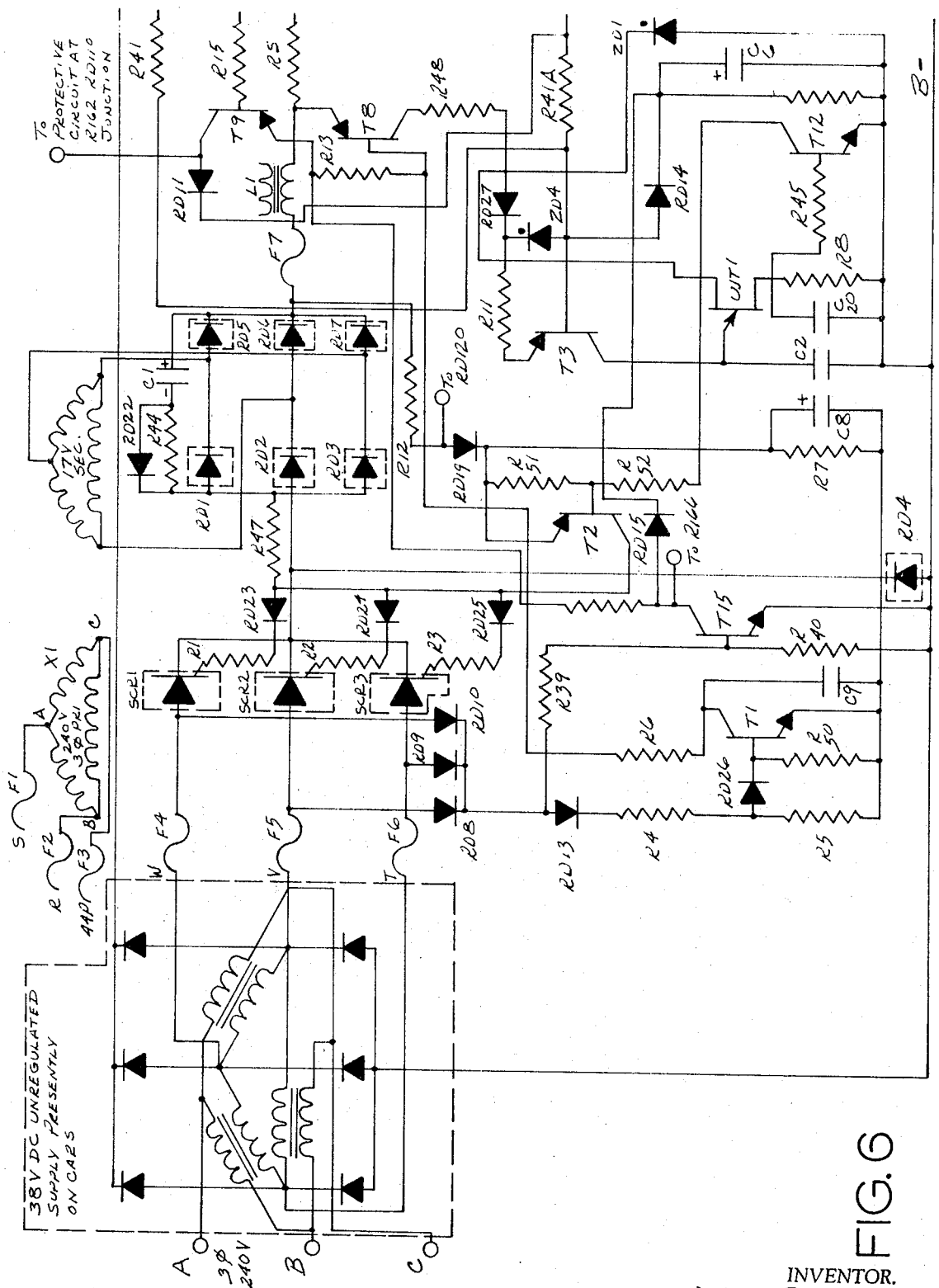
Figure 7:
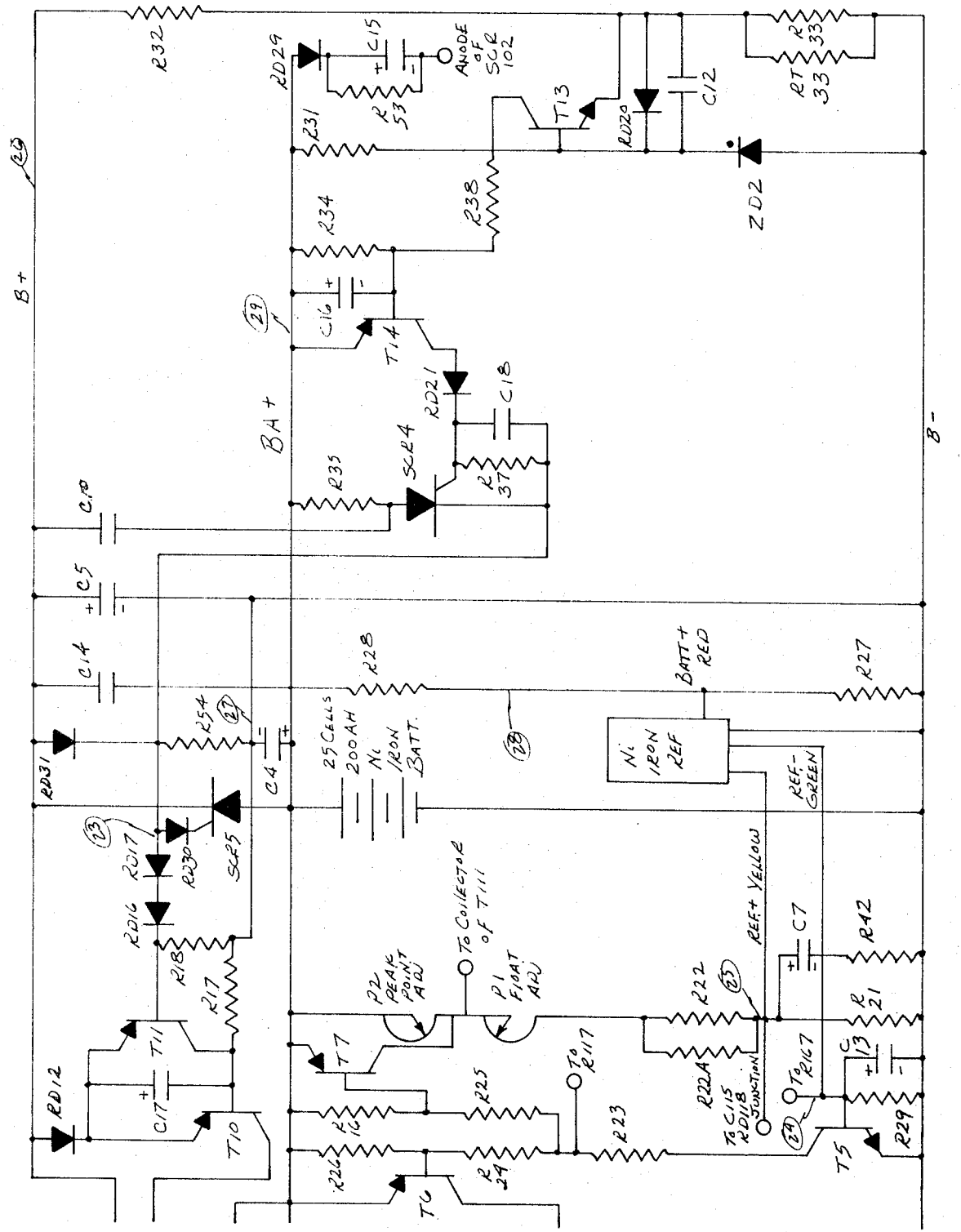

FIGS. 6 and 7 together comprise schematic circuitry for the battery charging system, the battery isolation and firing system, and the conductive sensing means of the isolating means.

GENERAL DESCRIPTION

A. Charging and Isolating Means

As stated in the foregoing, in the introduction, this information relates to a charge system for restoring full capacity to storage batteries at any operating temperature and in a manner which will restore said capacity in the shortest possible time with minimum water consumption. Referring now to the drawings, there is shown in FIGS. 1 and 2 a single line block diagram describing the charging system. With reference to FIGS. 1 and 2 - Block No. 1 and Block No. 2 are not included in the charging system. Block No. 1 steps down the 3-phase, 225 volt, 60 Hertz voltage from the alternator to approximately 27 volts - 3-phase suitable for the 3-phase rectifier represented by Block No. 2. Through conventional 3-phase rectification then block No. 2 provides the approximate 39 volts DC system power when the alternator is functioning. Notice that Block No. 3 is located between Battery (BA+) and (B−). This block represents a Silicon Controlled Rectifier used to electrically isolate the battery from B+ or system voltage at all times except when there is low B+ voltage, i.e., emergency power is required.

Block No. 4 is a voltage sensing means that continuously monitors the B+ system voltage and when this voltage drops below a predetermined level for any reason, a firing signal is generated to initiate the conduction of Silicon Controlled Rectifier represented by Block No. 3 thereby connecting the battery to the system -- thus, precluding an interruption in system voltage.

It has previously been stated that the charge system is capable of restoring the battery to its full capacity in the shortest possible time at any battery temperature. To accomplish this at low temperatures, for example 0° F. on 25 cells of Nickel Iron storage batteries, the battery voltage must be driven to approximately 49 volts.

Since this level of voltage cannot be tolerated on the B+ system, it becomes necessary to shut the charger off during the time that Silicon Controlled Rectifier 5 is conducting.

Block No. 5 contains sensing and decision logic circuitry that monitors the conducting state of Silicon Controlled Rectifier 5. When Silicon Controlled Rectifier 5 is conducting, Block No. 5 will generate the necessary signal into Block No. 6 which is the Silicon Controlled Rectifier firing circuit to stop firing of the controlling silicon controlled rectifiers - 1 through 3. These silicon controlled Rectifiers are shown in Block 7. Notice that they receive the same 27 volts, 3-phase, 60 Hertz voltage provided from Block No. 1 -- therefore, Block No. 7 is capable of producing a variable output which can be varied from the 39 volts produced by Block No. 2 as a maximum for a firing angle corresponding to 0° and 0 volts corresponding to the maximum retarded phase angle.

Block No. 8 is a 3-phase stepdown transformer that receives 225 volts, 3-phase, 60 Hertz from the system alternator and produces 16 volt, 3-phase for Block No. 9 which is a conventional 3-phase rectifier. The output of Block No. 9, then, is full wave rectified DC voltage (22 volts). Notice that to this output is added the output of Block No. 7, which is variable between 0 and 39 volts as has been previously described. Therefore, the filter choke shown in Block No. 10 receives a DC voltage level variable between 22 and 61 volts. The filter choke in Block No. 10 provides the necessary smoothing action on the charging current delivered to the battery. A second sensing winding on this filter choke provides information to the charging system on the level of current demanded by the battery under float voltage conditions.

Block No. 11 is a current sensing shunt, the output of which represents the level of charging current flowing into the battery. The charging system is designed to deliver the normal 7 hour charge rate at constant current into the storage battery. Therefore, Block No. 12 consists of a current limit reference and amplifier which will generate an output when the current attempts to exceed the normal 7 hour charge rate. This output is delivered to Block No. 6 which is the Silicon Controlled Rectifier firing circuit and will retard the firing phase angle thereby reducing charging voltage to effect the necessary current limiting action. This constant current charging characteristic assures full capacity restoration of the battery in the shortest possible time.

At any specific battery temperature the battery voltage that will be reached at normal charge current is a well defined, highly predictable value. Therefore, Block No. 13 represents a temperature reference located in the battery box that generates the necessary information to allow the charging system to know at what temperature the battery is operating. The output of Block No. 13 is received by Block No. 14 which is simply a battery voltage measuring divider. Block No. 14 generates an output when the battery voltage exceeds the predetermined value for the particular battery temperature being considered. This output is received by Block No. 15, which is a battery voltage limit error amplifier. An output of Block No. 15 will be generated when the battery voltage exceeds the predetermined voltage as predetermined by Block No. 1 and No. 14 and this output flows to Block No. 6 to retard firing or stop firing to limit further increases in battery voltage. Also this output flows to Block No. 14 to recalibrate the battery voltage measuring divider from the peak point to the float voltage point. The aforedescribed 15 blocks represent the entire charging system and utilize in a different hardware manner the battery charging teachings contained in my U.S. Pat. No. 3,585,482, which issued on June 15, 1971. The exception contained in this charging system deals with the isolation means of Block No. 3 and the conduction sensing and decision logic means of Block No. 5 which render the charger inoperative when the battery is connected to the system load.

B. Non-Essential System Load Reduction Drive

An auxiliary function is provided to reduce system loads to only those essential to the successful functioning of the system. Block No. 16 contains system voltage sensing and drive circuitry to energize non-essential load reduction relays when the system voltage drops to a predetermined level --thereby precluding excessive battery discharge. Typical examples of system loads considered non-essential would be the lighting level in excess of normal safe energency lighting levels.

C. Protective Circuitry

1. Hour Charging Timer - Since the charging philosopy utilized by this charging system is predicated on the fact that most efficient restoration of battery charged will be provided by the normal 7 hour charge rate and, in fact, the current limit of the charger is set for this rate, a 10 hour timing function represented by Block No. 17 serves the functions of automatically measuring the time that the battery is subjected to the normal charge rate. The valid assumption is used that if the battery calls for its normal 7 hour charge rate for a time period of 10 hours there must be something abnormal with the battery characteristics. Note that the 10 hour timer is activated by the ouput of Block No. 12 which exists only when the charger is in current limit, i.e., delivering the normal 7 hour charge rate.

The output of the 10 hour timer (Block No. 17) forces three functions -- firstly, the output is received by Block No. 14 and the battery voltage measuring divider therein is recalibrated from the voltage corresponding to a fully charged battery receiving normal charge rate to the voltage of a fully charged battery at float conditions where we define float voltage as that voltage that will maintain a fully charged battery in a fully charged state with minimum water consumption.

Secondly, the output of the 10 hour timer activates the one hour timer which will be explained later in the text. Thirdly, a 10 hour indicating light is energized to alert Maintenance Personnel of abnormal battery behavior.

2. One Hour High Float Current Timer

At this point we should again define the usage herein of the term float voltage. Float voltage is that voltage which will maintain a fully charged battery in a fully charged condition with minimum water consumption. As previously stated, the output of the 10 hour timer of Block No. 17 is received by the 1 hour timer of Block No. 18. Observe that the one hour timer is activated either by the combination of the output of the 10 hour timer and the high float current output of the filter choke sensor of Block No. 10 or by only the high float current output of Block No. 10 when the system voltage divider has been recalibrated to the float condition. Therefore, if the float current which, in a typical battery, might be approximately 0.4 amperes is drastically exceeded, the one hour timer will wait for one hour for this high float current to reduce to a more normal value. If this high float current persists for a time longer than one hour, the one hour timer of Block No. 18 will generate an output that is delivered to the firing circuit of Block No. 6 to stop firing of the controlling Silicon Controlled Rectifiers 1 through 3 and lock off the charger to prevent a possible fire in the battery. A typical cause for this fault condition would be a shorted cell in the 25 cell battery bank. Secondly, the output of the one hour timer will energize an indicating light represented by Block No. 21 to warn the Maintenance Department personnel of possible battery problems.

3. Poor Battery Connection or High Battery Voltage Detector.

Block No. 19 contains circuitry that will detect a poor battery connection or excessive battery voltage and if either condition exists an output will be generated and delivered to the firing circuit of Block No. 6 to stop firing of the controlling silicon controlled rectifiers 1 through 3, thus, locking off the charger precluding possible battery fires or other system damage. Also, indicating light of Block No. 21 will be energized to alert maintenance personnel of battery system problems.

4. Indicating Lights and Test PSH Buttons - Indicating Lights of Block No. 19 – No. 21 and No. 23 assist maintenance personnel in verifying battery system problems. Test push buttons contained in Blocks 20 – 22 and 24 provide means for testing the respective indicating lights and resetting the respective fault sensing systems.

DETAILED CIRCUIT FUNCTIONING DESCRIPTION

A. Non-Essential Load Reduction Drive

FIG. 3 contains a schematic diagram of the non-essential load reduction drive incorporated in the charging system. As previously described, the system function performed by this circuit prevents excessive battery discharge under emergency operating conditions by the removal of certain non-essential system loads in response to the system voltage. To this end, with reference to FIG. 3 - Silicon Controlled Rectifier SCR-201 connects the Battery voltage to the head of rectifying diode RD 203 and the external relays that will be used to remove the non-essential loads. Resistors R 210 and RT 210 combined with Resistor R 209 comprise a voltage sensing network connecting a portion of the system voltage through Rectifying Diode RD 206 to the head side of Zener Diode ZD 202 and to the base at Transistor T 201 out of the emitter of said transistor to battery negative. Therefore, the aforementioned network will render Transistor T 201 conductive when the predetermined voltage on Resistor R 209 exceeds the Zener Diode ZD 202 and the barrier voltages associated with Rectifier Diode RD 206 and emitter base of Transistor T 201. The collector of Transistor T 201 is connected to the Resistor R 211 and Capacitor C 204. Therefore, when Transistor T 201 is sufficiently conductive -- Rectifying Diodes Rd 201 and RD 201A are non-conductive. Rectifying Diode RD 201 is connected to the gate of SCR 201. As Transistor T 201 becomes non-conductive in response to a decrease in the B+ voltage, Rectifying Diodes RD 201 and RD 201A become forward biased and current will flow into the gate terminal of SCR 201 thereby rendering it conductive. Silicon Controlled Rectifier SCR 202 with Resistor R 202 and Capacitor C 201 provided the commutating energy to turn SCR 201 off after a predetermined conduction period set by the charging time constant of R 202 and C 201 and the energy logic measuring Zener Diode ZD 201 which will become conductive when the capacitor voltage level exceeding the breakdown voltage of ZD 201 Rectifying Diode RD 202 forward barrier and the forward barrier of gate to cathode junction of SCR 202. This energy logic commutation system is described in U.S. Pat. No. 3,585,482. Resistor R 203 and Capacitor C 201 provide rate of charge of voltage protection for SCR 202 and SCR 201. Resistors R 201 and R 204 are gate cathode bypass resistors for the silicon controlled rectifiers to assure high temperature stability. The output voltage delivered to the external relay coils is regulated to a predetermined acceptable value by sensing voltage divider R 205, R 206, R 207 and RT 207. Since average voltage is desired, integrating capacitor C 203 is provided. Coupling diode RD 204 provides the voltage feedback means to reference Diode ZD 202 to effect regulation. Coupling Diode RD 205 limits the collector to emitter voltage of T 201 of an acceptable value. Capacitor C 204 provides a predetermined time delay in the firing of SCR 20 -- thus precluding unwanted operations of the relays during very short duration decreases in the system voltage.

2. Detailed Circuit Descriptions of Protective Functions

FIGS. 4 and 5 contain schematic diagrams of the protective circuitry employed in this charging system. The protective functions have previously been described and include the requirement of measuring time for a period of 10 hours and a second requirement for a period of 1 hour; with reference to FIG. 4, note resistor R101 connects battery positive to a regulated buss, the voltage of which is regulated by Zener Diode ZD 101 and is filtered by capacitor C 101. The basic timing function is performed by the programmable unijunction transistor PUT 101 in conjunction with the timing capacitor C 102 which receives a preset charging current by a resistor R 102 and RT 102. The charge voltage on capacitor C 102 increases as a function of time until it exceeds the voltage set by the voltage divider consisting of resistor R 103 and R 104. At this voltage point, anode to gate triggers energy is delivered to PUT 101 and it is rendered conductive connecting the capacitor voltage through resistor R 105 to the winding marked 1–2 of reactor X 101. The reactor X 101 contains core material of the square loop characteristic. A bias applied to Reactor X 101 by winding 5–6 and Resistor R 106 to bias said reactor into negative saturation. The voltage of capacitor C 102 when applied to winding -102 is of sufficient magnitude to drive the flux in Reactor 101 to positive saturation after which time current is limited only by Resistor R 104 for the remainder of the discharge of timing Capacitor C 102. As is well known in the magnetic state of the art, the voltage time product of the voltage induced in winding 3–4 due to this flux excursion is a well defined value set by the saturating flux density of the core material and the cross sectional area of the core material. Therefore, in this application, the timing was set at 36 seconds and a predetermined volt second product appears on winding 3–4 each 36 seconds. Transistor T101 and T102 provide means to render the timing circuit inoperative in response to the high charge state of the battery charger sensed by shunt RS, transistor T9 emitter to base and limiting resistor R15. When transistor T9 is conductive, current flows from battery + through the emitter to collector of T9 through diode RD101, resistor R101, and to the integrating capacitor C103 to energize the base to emitter of T102 thereby activating the charger. A second activating means as previously described is provided by the sensor coils on the filtering choke. This voltage is rectified by rectifying diode RD113, RD114, RD115, RD116 and filtered by resistor R8, R149, RT148 and capacitor C117. When a predetermined level of current flows through the choke the system is tuned so that the voltage on C115 will exceed the zener diode voltage ZD103 through rectifying diode RD117, resistor R152 and base to emitter of transistor T102 thereby rendering the timer operative in response to a level of current through the choke in excess of the predetermined value. Certain other logic functions are performed by transistors T115 and T117 in response to this voltage through resistor R153 and will be described later.

We have generated a fixed volt second product on winding 3-4 of the reactor X101 at a period of 36 seconds when either normal charge current is delivered to the battery or excessive float current is delivered to the battery. Coupling transistor T-103 connects this fixed volt second product to winding 5-6 of reactor X102. Reactor X102 like X101 is constructed of the rectangular square loop core material. Each fixed volt second pulse will rachet of flux in X102 towards positive saturation. The number of turns of winding 5-6 will determine the flux change in X102 during each pulse. This flux change is set so that 10 pulses are required to cause a flux excursion in X102 between negative and positive saturation. When positive saturation is reached, the induced voltage of winding 2-1 goes to zero and the voltage on resistor R212 will cause a current to flow into winding 21 through resistor R114 and into the base emitter of T105 rendering T105 conductive and apply the regulated timing buss voltage through resistor R115 to reset winding 7-8, thereby, causing the flux to change in the negative direction herein defined as that flux direction that will make all dotted coil ends positive on the respective counting reactor X102, X103, X104. Therefore, a fixed volt second voltage is induced in winding 3-4 during reset and will occur after 10 36 second periods or each 6 minutes in like manner, this fixed volt second product pulse is coupled by coupling transistor T106 to winding 5-6 of X103 thereby providing, a pulse on winding 3-4 of X103 during its reset after 10 input pulses or once each hour.

In like manner it follows that the output of reactor X104 will occur on winding 3-4 after ten one-hour timing intervals. Coupling transistor T110 connects the output of the 10 hour timer through resistor R139, snubbing capacitors C116 and C119 to the gate of SCR101 to render it conductive thereby energizing the 10 hour warning light 1L101 through resistor R134 and also energizing transistor T119 through resistor R156 which in turn renders transistor T118 conductive through resistor R158 which in turn renders transistor T116 noninductive thereby activating the output of the one hour timer which must be inactivated during the 10 hour time period. The SCR101 also renders transistor T111 conductive through resistor R135 thereby shorting out P2 of FIG. 7 and recalibrating the voltage divider to the float condition. To preclude the successive summing of the high charge timing intervals, the timers must be reset each time the charger has successfully reached the full charge or peak point voltage condition. This is accomplished by rendering transistor T104 conductive by transistor T105 of FIG. 7 and the regenerative action of resistor R167 and C122 to apply a rapidly rising voltage pulse to the tails of rectifying diode RD101, RD102, RD103, thereby momentarily pulsing the respective reset transistor through capacitor C104, C106, and C108 respectively. Snubbing action to preclude unwanted reset is provided by the capacitors C105, C107, and C109 for the respective reset transistors. The coupling transistors T103, T106, T109, T110, and T121 are rendered inoperative during this reset function by transistor T113, which has been rendered nonconductive by transistor T114. This is accomplished by coupling the reset pulse through resistor R114 and capacitor C110 to the base of transistor T114. Push button PB101 of FIG. 5 will reset SCR 101 to a noninductive state by bypassing momentarily the anode cathode current. Further, it is seen that PB101 will activate the same circuitry as SCR 101 facilitating a test procedure. Through the charging of C115 upon release of PB101, the voltage of the Voltage divider network measuring battery voltage is momentarily decreased, thereby, momentarily making transistor T5 non-conductive, hence transistor T7 non-conductive facilitating the reset of the voltage measuring divider by the push button to high charge rate voltage point. The activation of transistor T109 output allows the one hour timer output to now flow through resistor R129 through rectifying diode RD111 to the gate of SCR102. SCR102 will connect resistor R12 of FIG. 6 to negative, thus removing firing pulses to the controlling SCR 1, SCR 2, and SCR 3. This renders the charger output to zero. Also, indicating light 1L102 is energized. Push button PB102 provides reset of SCR 102 and energizing of the SCR 102 loads for test and troubleshooting procedures. Resistors R130, RT130, R131, comprise a voltage dividing network sensing battery voltage. Should this voltage rise above a predetermined value due to either high battery impedance or poor battery connections, current flows through zener diode ZD102 rectifying diode RD 106 to the gate of SCR 102 rendering SCR102 conductive and the charger output to zero.

Transistor T120 is energized by the output of transistor T9 while the charging system is in current limit operation thereby, energizing indicating light 1L103 through limiting Resistor R161. A visual indication that the charging system is in the normal high charge rate is provided. Push button PB3 provides facility for testing of the indicating light 1L103. The one hour timer must also be activated in response to high float current. This is activated by the voltage on C117 exceeding the zener diode voltage ZD103. Current will flow through resistor R153 to the base of transistor T115 thereby rendering T115 conductive which in turn will render transistor T116 nonconductive to activate the output of the one hour timer. On the other hand, the output of the high float current sensing circuit must be inactivated during the normal 10 hour charge period and this is accomplished through logic means consisting of resistor R154 through which transistor T115 is rendered conductive thereby rendering transistor T115 non-conductive and hence transistor T116 conductive thereby bypassing the output of the one hour timer to negative through the conducting transistor T116.

Battery Charging, Isolating, Firing, and Conduction Controlled Sensing Circuitry FIGS. 6 and 7 are schematic diagrams describing a typical charging system. This system provides charging to a 25 cell nickel iron battery rated for 200 ampere hours capacity. With reference to FIG. 6, the 3-phase, 60 Hertz voltage is stepped down by a conventional transformer and through conventional 3-phase rectification the required 39 volts of DC power is provided for the system loads. The same 3-phase voltage is furnished through fuses F4, F5 and F6 to the anodes of Silicon Controlled Rectifiers 1, 2 and 3. This output is connected to the negative side of a conventional full wave 3-phase rectified supply provided by a second 3-phase stepdown transformer. Rectifiers RD1, RD2, RD3, RD5, RD6 and RD7 provide this 3-phase rectification. Capacitor C1 with limiting Resistor R44 and diode RD22 provide transient protection for the rectifying diodes RD1, RD2, RD3, RD5, RD6 and RD7. The combined output, then, of the controlling Silicon Controlled Rectifiers and the conventional rectifier bridge flows through Fuse 7 and into Inductor L1, through current measuring shunt, RS, to the positive terminal of the storage battery. The negative terminal of the storage battery is returned to the negative terminal of the normal system supply rectifying bridge. The Selected Controlled Rectifiers SCR 1 through SCR 3 receive firing pulses through rectifying diodes RD23, RD24, RD25 and sharing resistors R1, R2 and R3. The firing system applies a gate signal simultaneously to all three Silicon Controlled Rectifiers and the most positively forward biased silicon controlled rectifier will be rendered conductive. Transistor T2 controls the firing pulses in response to the unijunction pulse generating network UJT 1. When the charge voltage on capacitor C2 exceeds the stand-off ratio of UJT 1 a regenerative action will occur and a voltage pulse will be generated on Resistor R8 and Capacitor C20. Capacitor C20 will extend the duration of this pulse as applied to the base of T12 through Resistor R45. The conductive state of T12 will, in turn, render the Transistor T2 conductive through Resistor R52-- thereby applying the firing voltage pulse to the Silicon Controlled Rectifier gates. Capacitor C8 assists in providing the pulse energy which can then be stored during the time between pulses. The pulse energy source consists of resistor R12 - rectifying diode RD19 - Resistor R7 and cpacitor C8 and is derived from the full wave rectifyed output of RD 1 - RD 2 - RD 3- RD 5- RD 6 and RD 7. The Unijunction timing capacitor receives its charge through the control of transistor T3. Transistor T 3 includes an emitter resistor R 11, thus, providing a constant current regulating action in charging capacitor C2. Feedback to effect current regulation is provided by transistor T9, which is rendered conductive by the voltage drop across the current measuring shunt RS. The emitter to base barrier of transistor T9 is utilized as the reference element. When the voltage across RS exceeds approximately 0.6 volts T9 will become conductive and deliver current from the collector to the protective circuits previously described and through rectifying diode RD1 through limiting resistor R41A to the base of the timing current limiter transistor T3. As the transistor T9 is made more conductive the base voltage of T3 is raised and this will reduce the current to the timing capacitor C2. In this manner, the phase angle is retarded thereby decreasing the charging voltage source and hence limiting the charging current. Circuit means must be provided for synchronizing the timing of the unijunction circuit. This is accomplished as follows: At the instant that any of the anodes of the silicon controlled rectifiers SCR1 through SCR3 become positive with respect to their common cathodes, current will flow from the most positive anode through one of the Silicon Rectifying Diodes - RD 8 through RD 10. This current will flow through RD 13 through limiting Resistor R 4 through Rectifier Diode RD 26 to the base of Transistor T 1 -- thereby rendering T1 conductive. Through Resistor R 6, current will now flow out of the base of T 8-- thereby rendering T 8 conductive. Through limiting Resistor R 48 current will flow into the Unijunction timing circuitry and the associated regulating Zener Diode ZD 1. Therefore, the Unijunction timing supply will always start at the time that a Silicon Controlled Rectifier is forward biased and will be cleared at the instant that the Silicon Controlled Rectifier is rendered conductive. This synchronizing means provides even firing of the Silicon Controlled Rectifiers SCR 1 through SCR 3. With reference to FIG. 7 - note the reference unit connected between Resistors R 28 and R 27 and Resistors R 22 and R 21 and, also, to battery negative and the base of Transistor T 5. This is the temperature sensing reference more completely described in my U.S. Pat. No. 3,585,482. Resistor R 28 and R 29 consists of a voltage divider to decrease the B+ voltage for the reference unit to a suitable design value. The temperature sensing reference unit will provide a voltage reference between the junction point of R 22 and 21 and the base of Transistor T 5 that will follow the temperature characteristics of the particular battery being charged. As the battery terminal voltage increases under the normal charge rate limited by the previously described current limiting system, the voltage across Resistor R 21, as set by the voltage measuring divider consisting of R 21 – R 22 and R 22A P 1 and P 2 will rise until a current will flow through the reference unit to the base of Transistor T 5 -- thus rendering T 5 conductive. The current will flow through Resistor R 23 and begin to lower the potential of the junction point of R 25 and R 25. Resistors R 25, R 26, R 16 and R 25 are selected such that Transistor T 7 becomes conductive prior to Transistor T 6. As this occurs the voltage across potentiometer P 2 is decreased, thereby further increasing the current into Transistor T 5 base. This constitutes a regenerative action which will completely saturate Transistor T 7. This Transistor action has recalibrated the voltage divider to the proper float voltage for the batteries being charged. As the battery voltage attempts to drop below the predetermined float voltage required to maintain the battery fully charged, the unijunction firing circuit is allowed to generate a voltage pulse that will fire the most positive SCR -- thereby maintaining the proper float voltage. Functionally, the charging action described so far is identical to that described in my Pat. No. 3,585,482. Refer now to Silicon Controlled Rectifier SCR 5 connected between the positive battery terminal and the system B+ voltage. Resistor R 32, R 33 and RT 33 constitute a voltage divider that measures the system B+ voltage. Resistor R 31 and Zener Diode ZD 2 constitute a reference voltage. As the system B+ voltage decreases to a predetermined level, Transistor T 13 becomes conductive due to the emitter dropping below the base voltage set by reference Zener Diode ZD 2. Current will flow through Resistor R 38 and from the base of Transistor T 14 thereby rendering T 14 conductive. T 14 rendered conductive will cause a gate current to flow into the Silicon Controlled Rectifier SCR 4 thereby rendering it conductive and, therefore, applying through limiting Resistor R 35 a firing voltage on the gate of Isolating Silicon Controlled Rectifier SCR 5, thereby rendering said Silicon Controlled Rectifier conductive. The battery voltage is now connected to the B+ system supply. As previously described the charging voltage which can, under certain conditions, exceed the tolerable system B+ voltage, must be reduced. Through Transistors T 10 and T 11, current is supplied through Resistor R 41 to the base of T 3 to prevent unijunction timing pulses. Transistor T 10 is rendered conductive when Transistor T 11 is rendered non-conductive. This will occur when the Silicon Controlled Rectifier SCR 5 is conducting current.

The foregoing specification sets forth the invention in its preferred embodiment; however, it is understood that changes may be made in the components and specific arrangement of minor components without departing from the invention which is understood to be broadly novel as set forth in the appended claims.

The embodiments of the invention in which an exclusive property or privilege is claimed are defined as follows:

1. In an emergency battery charging system adapted to be connected to and disconnected from a load and adapted to control the voltage and current delivered to a battery in said circuit from a power source,
in combination, a battery, said battery being adapted to be connected to a load,
battery charging means,
a source of system voltage for said load,
first electronic valve isolation means for blocking electrical current from said battery to said load,
and means for triggering said first electronic valve isolation means into conductive state when said system voltage drops below a predetermined value,
said first electronic valve isolation means having means retaining it in conductive state until said source of system voltage reaches a predetermined value,
said batttery charging means including second electronic valve means having a control element,
said second electronic valve means connecting said battery charging means to said battery and logic means connected to said control element of said second electronic valve means for rendering said battery charging means inoperative when said first electronic valve isolation means is conductive.

2. The combination recited in claim 1 wherein said valve means comprises a silicon-controlled rectifier, and said sensing means comprises decision and logic means adapted to generate the necessary signal into said charger limiting means for controlling said battery charger.

3. The combination recited in claim 2 wherein said source of system voltage comprises a three phase step-down transformer,
and rectifier means for converting an AC voltage to said system voltage.

4. The combination recited in claim 1 wherein said battery charging means comprises a charger control means connected to said system voltage,
said charger control means being capable of producing a variable output voltage,
and means connected to said charger control means for varying said output voltage between a maximum voltage and a minimum voltage,
said voltages being actuated by means producing a maximum phase angle and a minimum phase angle of the said AC source voltage.

5. The combination recited in claim 2 wherein a filter choke is provided connected to said battery charger and to said isolation means whereby a smoothing action of said charging current delivered to said battery is provided,
said filter choke having a sensing winding connected to said battery for providing information to the charging system on the level of current demanded by the said battery under float voltage condition.

6. The combination recited in claim 5 wherein a current sensing shunt is connected in series with said choke and said battery,
said sensing shunt has means sensing the charging current flowing into the said battery,
said sensing shunt being connected to means to continue said charging rate to said battery for a predetermined time.

7. The combination recited in claim 6 wherein a current limiting reference and amplifier are connected to said current measuring shunt whereby the charging rate of said battery charger is limited when said battery reaches a fully charged condition.

8. The combination recited in claim 1 wherein a battery temperature sensing means is connected to said battery charging means whereby the charging rate of said battery charger is limited when the temperature of the water in said battery exceeds a predetermined amount.

9. The circuit recited in claim 8 wherein said valve means comprises a silicon control rectifier and said silicon control rectifier is connected to said sensing decision and logic circuit.

10. The circuit recited in claim 9 wherein said source of charging voltage includes means to vary the output voltage of said charging voltage source.

11. The circuit recited in claim 10 wherein said means to vary said output voltage of said charging voltage source comprises means to change the phase angle of the firing circuit to said silicon control rectifier to maintain a battery connected to said circuit at a predetermined voltage.

12. The circuit recited in claim 11 wherein a float voltage means is connected to said battery.

13. The circuit recited in claim 12 wherein said voltage sensing means is connected to said silicon control rectifier for isolating said battery from said load when said battery charging voltage is connected to said battery.

14. The circuit recited in claim 13 wherein a current sensing shunt is connected in series with said battery charging voltage and said battery, and current limiting means is connected to said current sensing shunt to connect its output to a second silicon control rectifier connected in said circuit to limit the charging current when said charging voltage exceeds a predetermined value.

15. The circuit recited in claim 13 wherein said means connected to said current sensing shunt has means to control said second silicon control rectifier to deliver a constant current to said battery thereby restoring said battery charge in an optimum time.

16. The circuit recited in claim 15 wherein a temperature sensing means is provided to sense the temperature of a battery connected to said source of charging voltage, said temperature sensing means being connected to said second silicon control rectifier and adapted to reduce said charging voltage when said battery voltage exceeds a predetermined value.

17. The combination recited in claim 13 wherein a circuit means is provided to disconnect unessential loads from said power source when the voltage of said power source drops below a predetermined value.

and voltage sensing means connected to said battery isolation means and to said system voltage, and charger limiting means connected to said battery charging means for shutting off said charger when said system voltage falls below a predetermined value, said battery isolation means being controlled by said voltage sensing means connecting said battery to said load means and turning off said charging means when said system voltage drops below a predetermined value and disconnecting said battery from said load means and turning on said battery charging means when said system voltage exceeds said battery voltage by a predetermined value whereby said load is protected from said battery charging voltage.

18. In an emergency battery charging system adapted to be connected to and disconnected from a load and adapted to control the voltage and current delivered to a battery in said circuit from a power source, in combination, a battery, said battery being adapted to be connected to a load, battery charging means, a source of system voltage for said load, first electronic valve isolation means for blocking electrical current from said battery to said load, and means for triggering said first electronic valve isolation means into conductive state when said system voltage drops below a predetermined value, said first electronic valve isolation means having means retaining it in conductive state until said source of system voltage reaches a predetermined value, said battery charging means including second electronic valve means having a control element, said second electronic valve means connecting said battery charging means to said battery and logic means connected to said control element of said second electronic valve means sensitive to the conductive state of said first electronic valve isolation means for rendering said battery charging means inoperative when said first electronic valve isolation means is conductive.

19. The system recited in claim 18 wherein a voltage reference means is connected to said battery charging means and said voltage reference means controlling said control circuit means and having a first portion establishing a first reference value related to a first battery voltage and a second portion establishing a second reference value related to a preselected higher battery voltage, battery voltage sensing circuit means coupled to said voltage reference means, voltage control circuit means coupled to said voltage reference means and responsive to said battery voltage sensing circuit means for coupling said second portion in effective circuit relationship in the voltage reference means whereby said control circuit means is selectively controlled at said second reference value upon the battery voltage falling below the first battery voltage value and is maintained at said second reference value until said battery attains a preselected higher voltage value.

* * * * *